(12) United States Patent
Muratov et al.

(10) Patent No.: US 11,677,273 B2
(45) Date of Patent: *Jun. 13, 2023

(54) DRIVE CIRCUITS FOR MULTI-MODE WIRELESS POWER TRANSMITTER

(71) Applicant: MediaTek Inc., Hsin-Chu (TW)

(72) Inventors: Vladimir A. Muratov, San Jose, CA (US); Yung-Chih Yen, Tainan (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,124

(22) Filed: Sep. 30, 2020

(65) Prior Publication Data

US 2021/0013741 A1  Jan. 14, 2021

Related U.S. Application Data

(62) Division of application No. 14/960,541, filed on Dec. 7, 2015, now Pat. No. 10,826,300.

(60) Provisional application No. 62/193,800, filed on Jul. 17, 2015.

(51) Int. Cl.
| | | |
|---|---|---|
| H02J 50/40 | (2016.01) | |
| H02J 50/20 | (2016.01) | |
| H04B 5/00 | (2006.01) | |
| H02J 50/12 | (2016.01) | |
| H02J 50/10 | (2016.01) | |

(52) U.S. Cl.
CPC .............. H02J 50/20 (2016.02); H02J 50/10 (2016.02); H02J 50/12 (2016.02); H02J 50/402 (2020.01); H04B 5/0037 (2013.01)

(58) Field of Classification Search
CPC ...................................................... H02J 50/40
See application file for complete search history.

(56) References Cited

U.S. PATENT DOCUMENTS

| | | | |
|---|---|---|---|
| 6,160,374 | A | 12/2000 | Hayes et al. |
| 7,027,311 | B2 | 4/2006 | Vanderelli et al. |
| 9,022,293 | B2 | 5/2015 | Osada et al. |
| 9,859,744 | B2 | 1/2018 | Riehl |
| 9,893,567 | B2 | 2/2018 | Riehl |
| 9,912,197 | B2 | 3/2018 | Riehl |
| 10,135,305 | B2 | 11/2018 | Muratov et al. |
| 10,141,769 | B2 | 11/2018 | Bae |

(Continued)

FOREIGN PATENT DOCUMENTS

| | | |
|---|---|---|
| CN | 102870338 A | 1/2013 |
| CN | 103098330 A | 5/2013 |

(Continued)

OTHER PUBLICATIONS

Extended European Search Report for Application No. EP 16179119.9 dated Nov. 29, 2016.

(Continued)

*Primary Examiner* — Daniel Cavallari
(74) *Attorney, Agent, or Firm* — Wolf, Greenfield & Sacks, P.C.

(57) ABSTRACT

A multi-mode wireless power transmitter includes a first drive circuit of a first type and a second drive circuit of a second type. The first drive circuit is configured to drive a first transmit coil at a first frequency. The second drive circuit is configured to drive a second transmit coil at a second frequency higher than the first frequency.

6 Claims, 6 Drawing Sheets

(56) References Cited

U.S. PATENT DOCUMENTS

| | | |
|---|---|---|
| 10,658,869 B2 | 5/2020 | Muratov et al. |
| 10,826,300 B2 | 11/2020 | Muratov et al. |
| 2007/0229281 A1 | 10/2007 | Shionoiri et al. |
| 2009/0096413 A1 | 4/2009 | Partovi et al. |
| 2011/0169338 A1 | 7/2011 | Kozakai |
| 2011/0304216 A1 | 12/2011 | Baarman |
| 2012/0146580 A1 | 6/2012 | Kitamura |
| 2013/0015705 A1 | 1/2013 | Abe |
| 2013/0049484 A1 | 2/2013 | Weissentern et al. |
| 2014/0035383 A1 | 2/2014 | Riehl |
| 2014/0159656 A1 | 6/2014 | Riehl |
| 2014/0175868 A1 | 6/2014 | Sakakibara et al. |
| 2014/0375139 A1 | 12/2014 | Tsukamoto |
| 2015/0115723 A1 | 4/2015 | Levo et al. |
| 2015/0180286 A1* | 6/2015 | Asanuma ............ H02J 50/90 307/104 |
| 2015/0357827 A1 | 12/2015 | Muratov et al. |
| 2015/0380944 A1* | 12/2015 | Yu ................. H02J 50/12 307/104 |
| 2016/0211702 A1 | 7/2016 | Muratov et al. |
| 2016/0261148 A1 | 9/2016 | Riehl |
| 2017/0018936 A1 | 1/2017 | Muratov et al. |
| 2017/0310164 A1* | 10/2017 | Abdolkhani ............ H02J 50/12 |
| 2017/0338696 A1 | 11/2017 | Bae et al. |
| 2018/0048185 A1 | 2/2018 | Hwang et al. |
| 2018/0198322 A1 | 7/2018 | Mercier et al. |

FOREIGN PATENT DOCUMENTS

| | | |
|---|---|---|
| CN | 204290506 U | 4/2015 |
| EP | 1 960 947 B1 | 9/2010 |
| GB | 2521492 A | 6/2015 |
| JP | 2008-009910 A | 1/2008 |
| WO | WO 2015/065810 A1 | 5/2015 |

OTHER PUBLICATIONS

Rivas et al., A high-frequency resonant inverter topology with low voltage stress. 2007 IEEE Power Electronics Specialists Conference Jun. 17, 2007:2705-2717.

Roslaniec et al., Design of single-switch inverters for variable resistance/load modulation operation. IEEE Transactions on Power Electronics. Jun. 18, 2014;30(6):3200-14.

[No Author Listed], Gleichrichter. Wikipedia. Nov. 2022. 38 pages. https://de.wikipedia.org/wiki/Gleichrichter (Last accessed Feb. 6, 2023).

* cited by examiner

DRIVE CIRCUITS FOR MULTI-MODE WIRELESS POWER TRANSMITTER

CROSS-REFERENCE TO RELATED APPLICATIONS

This application is a Divisional of U.S. application Ser. No. 14/960,541, titled "DRIVE CIRCUITS FOR MULTI-MODE WIRELESS POWER TRANSMITTER," filed Dec. 7, 2015, which claims priority to U.S. provisional application Ser. No. 62/193,800, titled "MULTI MODE WPTX WITH CLASS-D AND CLASS-E DRIVER COMBO," filed Jul. 17, 2015, which is hereby incorporated by reference in its entirety.

BACKGROUND

1. Technical Field

The techniques described herein relate generally to wireless power delivery, and particularly to a wireless power transmitter capable of transmitting wireless power at more than one frequency.

2. Discussion of the Related Art

Wireless Power Transfer Systems (WPTS) are gaining increasing popularity as a convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications.

Inductive WPTS typically operate in an allocated frequency range of several hundred kilohertz using frequency variation as a power flow control mechanism. MR WPTS typically operate on a single resonant frequency using input voltage regulation to regulate output power. In typical applications, MR WPTS operate at a frequency of 6.78 MHz.

Several industry committees such as the Wireless Power Consortium (WPC), the Power Matters Alliance (PMA), and the Alliance for Wireless Power (A4WP) have been working on developing international standards for consumer products based on wireless power transfer. Currently, due to the difference in operating frequency, WPTS systems of different types are not interoperable. This creates complications and inconveniences to wireless system users and limits proliferation of the technology.

SUMMARY

Some embodiments relate to a wireless power transmitter, comprising: a first drive circuit of a first type, the first drive circuit being configured to drive a first transmit coil at a first frequency; a second drive circuit of a second type, the second drive circuit being configured to drive a second transmit coil at a second frequency higher than the first frequency; and an enable circuit configured to enable the first drive circuit to drive the second drive circuit at the second frequency.

Some embodiments relate to a wireless power transmitter, comprising: an integrated circuit comprising a first drive circuit of a first type, the first drive circuit being configured to drive a first transmit coil at a first frequency; and a second drive circuit of a second type, at least a portion of the second drive circuit being separate from the integrated circuit, the second drive circuit being configured to drive a second transmit coil at a second frequency higher than the first frequency.

Some embodiments relate to a wireless power transmitter, comprising a first drive circuit of a first type, the first drive circuit being configured to drive a first transmit coil at a first frequency; and a second drive circuit of a second type, the second drive circuit being configured to drive a second transmit coil at a second frequency higher than the first frequency.

Some embodiments relate to a wireless power transmission method, comprising enabling the first drive circuit to drive the second drive circuit at the second frequency.

Some embodiments relate to a wireless power transmission method, comprising driving a first transmit coil at a first frequency using a first drive circuit and driving a second transmit coil at a second frequency using a second drive circuit.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

The inventors have recognized and appreciated that a multi-mode wireless power transmitter capable of transmitting wireless power at different frequencies can facilitate providing power to different types of wireless power receivers designed to operate at different frequencies. Such a multi-mode wireless power transmitter can allow providing power to a wider variety of electronic devices. For example, in some embodiments a multi-mode wireless power transmitter can be configured to provide power to both MI and MR receivers. In some embodiments, a multi-mode wireless power transmitter can provide power to devices that are designed according to a variety of different wireless charging specifications, such as the Qi standard promulgated by WPC, and other specifications designed for wireless power delivery at other frequencies, such as specifications for MR receivers, or other MI specifications. Such a multi-mode wireless power transmitter can support different types of receivers, enabling consumers to avoid the need to make a choice between different wireless power specifications, and can reduce or eliminate the need to acquire multiple wireless transmitters to power devices that receive wireless power at different frequencies.

The inventors have recognized and appreciated that different types of drive circuits may be appropriate for transmitting wireless power at different frequencies. For example, a class D inverter may be suitable for driving a wireless transmission coil at a relatively low frequency, and may be formed on an integrated circuit chip. However, since a class D inverter may have relatively high switching losses at higher frequencies, a class E amplifier may be more suitable for driving a wireless transmission coil at relatively high frequencies.

Described herein are embodiments of wireless power transmitters that include both a first type of drive circuit (e.g., a class D inverter) for driving wireless power transmission at a first frequency and a second type of drive circuit (e.g., a class E amplifier) for driving wireless power transmission at a second, higher frequency.

Figure 1:
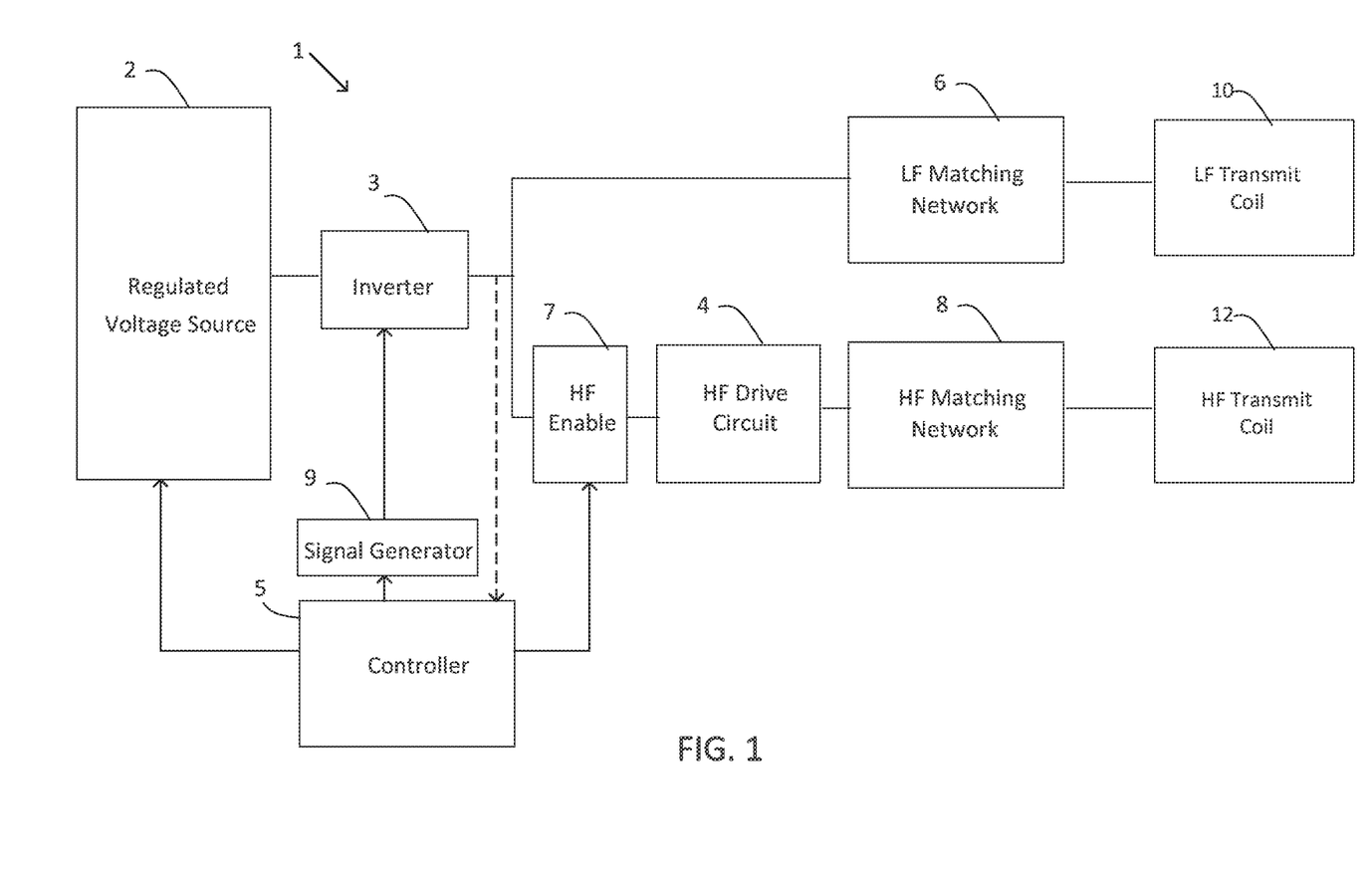
FIG. 1 shows a block diagram of a multi-mode wireless power transmitter having an inverter that can drive a low frequency transmit coil or a high frequency drive circuit.

FIG. 1 shows a block diagram of a multi-mode wireless power transmitter 1 in which an inverter 3 drives a low frequency transmit coil 10 via a low frequency matching network 6 and a high frequency drive circuit 4 drives a high frequency transmit coil 12 via a high frequency matching network 8. For example, to transmit power to a receiver designed to receive wireless power according to the Qi specification, the inverter 3 may be switched at a relatively low frequency between 100 and 205 kHz for low power Qi receivers and 80-300 kHz for medium power Qi receivers. To transmit power to a receiver designed to receive wireless power using MR technology, the inverter 3 (and high-frequency drive circuit 4) may be switched at a higher frequency, such as a frequency of greater than 1 MHz, within an ISM band, e.g., 6.765 MHz to 6.795 MHz. However, these frequencies are described merely by way of example, as wireless power may be transmitted at a variety of suitable frequencies, in accordance with any suitable specification.

The multi-mode wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. The inverter 3 may be a DC-AC converter that converts the DC voltage at the input of inverter 3 into an AC output voltage that is sent to a low frequency transmit coil 10. Producing an AC output voltage enables wireless power transmission through electromagnetic induction.

The inverter 3 may be any suitable drive circuit for driving the low frequency transmit coil 10 to deliver wireless power. The inverter 3 may be a half-bridge inverter or a full-bridge inverter. In some embodiments, a half-bridge inverter may produce an output voltage that alternates as a square wave between the DC voltage at the input and ground voltage. In some embodiments, a full-bridge inverter may produce an output voltage that alternates as a square wave between the DC voltage at the input and a negative polarity version of the input DC voltage. In some embodiments, the inverter 3 may be a push-pull drive circuit. In some embodiments, the inverter 3 may be a class D switching inverter. In some embodiments, the inverter 3 may be a non-resonant inverter. However, the techniques described herein are not limited in these respects, as any suitable type of inverter may be used.

A controller 5 of the multi-mode wireless power transmitter may control a signal generator 9 to drive the inverter 3 with signals of a selected wireless power transmission frequency. Controller 5 may be an analog circuit or a digital circuit. Controller 5 may be programmable, and may command signal generator 9 to produce signals at a desired transmission frequency based on stored program instructions, so that inverter 3 switches at the desired transmission frequency.

The transmit coils 10, 12 may be realized by any suitable type of conductors. The conductors may be wires, including solid wire or Litz wire, or patterned conductors, such as patterned conductors of a PC board or an integrated circuit.

One or more matching networks 6, 8 may be provided for the transmit coils which facilitate wireless power delivery by presenting a suitable impedance to the output of the inverter 3 and the high frequency drive circuit 4, respectively. The matching network(s) may have one or more capacitive or inductive elements or any suitable combination of capacitive and inductive elements. Since the transmit coils may have an inductive impedance, in some embodiments the matching network(s) may include one or more capacitive elements, which, when combined with the impedance(s) of a transmit coil, presents an impedance to the output of drive circuit 3 or 4 suitable for driving the respective transmit coil.

Figure 2:
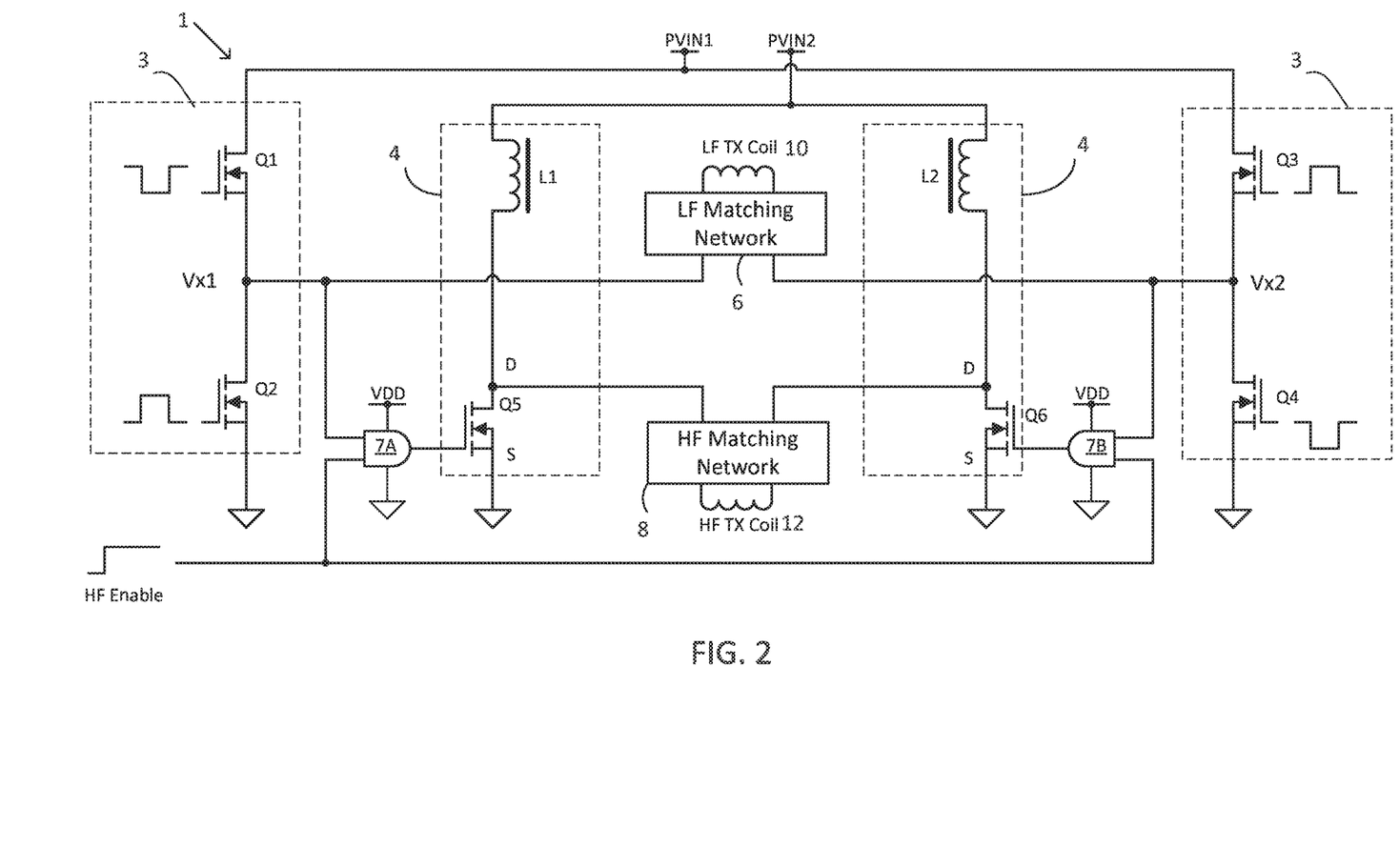
FIG. 2 shows an example of a multi-mode wireless power transmitter according to FIG. 1, in which an inverter is implemented by a push-pull drive circuit and a high frequency drive circuit is implemented by a class E amplifier.

The multi-mode wireless power transmitter may include an enable circuit 7 that enables operation of the high frequency drive circuit 4 when a high frequency signal is produced at the output of the inverter 3. In some embodiments, the enable circuit 7 may include a frequency discriminator that receives the signal produced by the inverter 3 and discriminates whether it is in a low frequency range suitable for wireless power transmission using the low frequency transmit coil 10 or a high frequency range suitable for wireless power transmission using the high frequency transmit coil 12. If enable circuit 7 detects the output of inverter 3 has a frequency suitable for wireless power transmission using the high frequency transmit coil 12, the enable circuit 7 may provide the output of the inverter 3 to the input of the high frequency drive circuit 4. However, the enable circuit 7 need not include a frequency discriminator. In some embodiments, the enable circuit 7 may include a switch, demultiplexor or other switching circuit (e.g., an AND gate, as shown in FIG. 2) that is configured to receive a control signal indicating whether the output of the inverter 3 should be provided to the input of the high frequency drive circuit 4. In response to the control signal, the enable circuit 7 connects or disconnects the output of the inverter 3 to/from the input of the high frequency drive circuit 4. The control signal may be produced by controller 5 or any other suitable circuitry. The controller 5 may measure the output of the inverter 3. In some embodiments, the controller 5 may execute a program that discriminates the frequency of the signal at the output of the inverter 3, and may produce a control signal (e.g., a logical zero or one) that indicates to the enable circuit 7 whether to enable the high frequency drive circuit 4.

In some embodiments, the high frequency drive circuit 4 may be an inverter that is designed to minimize or otherwise reduce switching power losses. Switching power losses are incurred in a switch when there is a non-zero voltage across the switch and it is turned on or off, which dissipates or charges the switch's parasitic capacitance. Switching power losses are proportional to frequency, and therefore are more severe at high frequencies. Switching losses can be minimized or reduced by using an inverter that is designed to turn the switch on or off when the voltage across the switch falls to a reduced value, e.g., a (positive) voltage threshold of less than half of an input voltage of the high frequency drive circuit 4. In some embodiments, the inverter is designed to turn the switch on or off when the voltage across the switch is zero or close to zero. Such a technique is termed "zero-voltage switching."

In some embodiments, the high frequency drive circuit may be a resonant inverter; the high frequency drive circuit may be a class E amplifier. A class E amplifier may use L-C resonance to cause the voltage across a switch to ring down to zero or approximately zero, which can achieve or approximate zero-voltage switching. However, the techniques described herein are not limited to use of a class E amplifier for the high frequency drive circuit 4, as another suitable amplifier configuration may be used, such as another type of resonant inverter. The high frequency drive circuit 4 may be a single-ended amplifier or a differential amplifier, as the techniques described herein are not limited in this respect.

FIG. 2 shows an example of a multi-mode wireless power transmitter 1 in which the inverter 3 is implemented by a class D full-bridge inverter and the high frequency drive circuit 4 is implemented by a class E differential amplifier. As shown in FIG. 2, the inverter 3 includes transistors Q1-Q4 arranged in a full bridge configuration. Transistors Q1 and Q2 are alternatively switched on and off to produce a square wave output voltage Vx1 that alternates between voltage PVIN1 and ground. Similarly, transistors Q3 and Q4 are alternatively switched on and off to produce a square wave output voltage Vx2 that alternates between voltage PVIN1 and ground. Voltages Vx1 and Vx2 have the same waveform but are phase shifted with respect to one another by 180°. Transistors Q1-Q4 may be switched at a frequency suitable for driving wireless power transmission by the low frequency transmit coil 10 (termed a "low frequency") or a frequency suitable for driving transmission by the high frequency transmit coil 12 (termed a "high frequency"). When transistors Q1-Q4 are switched at the low frequency, the control signal HF enable is set low, and the enable circuits 7A and 7B turn off the high frequency drive circuit 4 by disconnecting the path between the inverter 3 and the high frequency drive circuit 4. Vx1 and Vx2 drive the low frequency transmit coil 10 via the low frequency matching network 6. When transistors Q1-Q4 are switched at the high frequency, the control signal HF enable is set high, and the enable circuits 7A and 7B activate the high frequency drive circuit 4 by establishing a connection between the inverter 3 and the high frequency drive circuit 4. Vx1 and Vx2 serve as drive signals to drive the gates of transistors Q5 and Q6, respectively, of the high frequency drive circuit 4. The low frequency matching network 6 has a high impedance at the high frequency, and therefore inhibits the low frequency transmit coil 10 from transmitting when signals Vx1 and Vx2 are high frequency signals.

In some embodiments, power terminals PVIN1, PVIN2 and VDD may be at different voltages. For example, PVIN2 may be at a higher voltage than PVIN1. However, the techniques described herein are not limited in this respect, as one or more of these control inputs may be at the same voltage. In some embodiments, the voltages of one or more of the power terminals PVIN1, PVIN2 and VDD may be controllable. For example, the voltages of one or more of the power terminals may be changed (e.g., reduced) to reduce power consumption when not being used. For example, in some embodiments, the voltage of PVIN1 may be reduced when the high frequency drive circuit 4 is activated. The voltage of PVIN1 may be reduced to less than half its value, and in some embodiments may be reduced to zero.

Figure 3A:
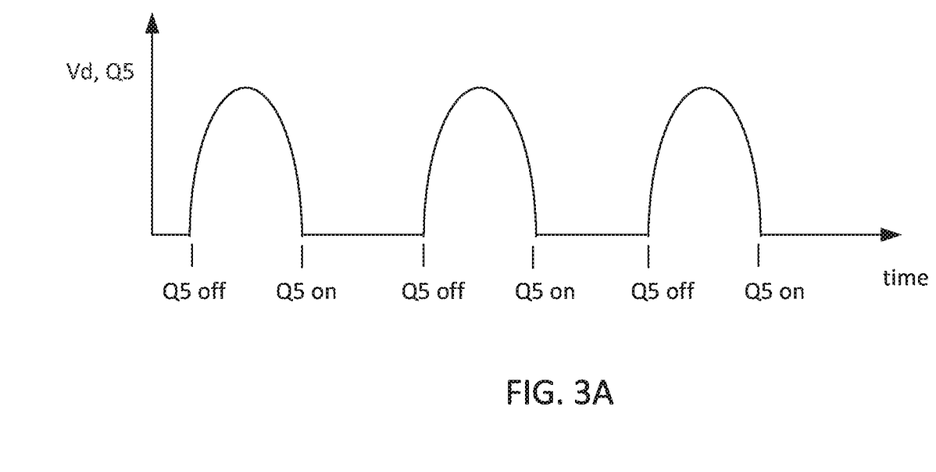
FIGS. 3A and 3B show transistor drain voltage waveforms for the transistors of the class E amplifier of FIG. 2.
Figure 3B:
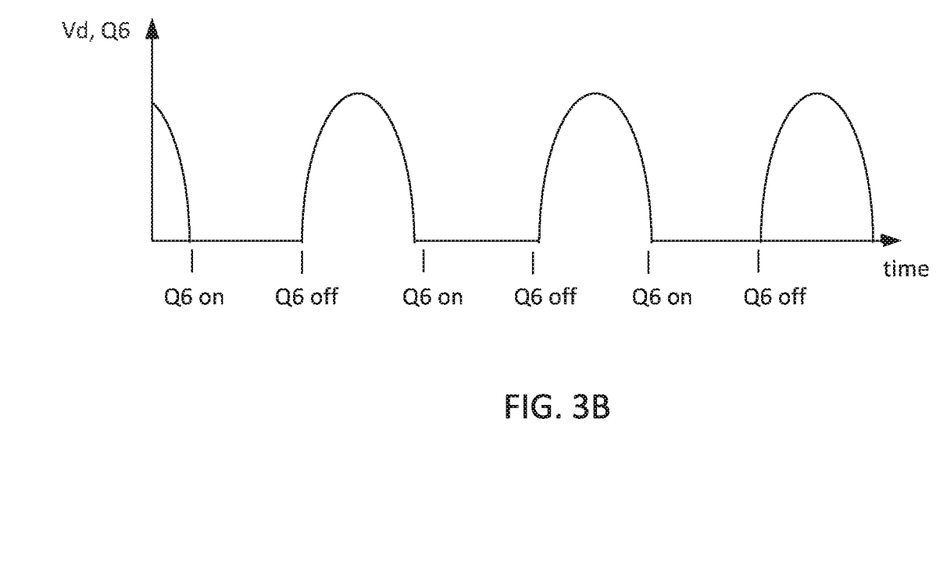

FIG. 3A shows the drain voltage waveform of transistor Q5 when the high frequency drive circuit 4 is enabled, according to some embodiments. When transistor Q5 is turned off (non-conductive), the drain voltage rises sinusoidally due to the resonance between the inductor L1 and a capacitance of the high frequency matching network 8. When the drain voltage rings down to zero, transistor Q5 is turned on. Thus, transistor Q5 can operate with zero voltage switching, which can improve the efficiency of the high frequency drive circuit 4. FIG. 3B shows the drain voltage waveform of transistor Q6 when the high frequency drive circuit 4 is enabled, according to some embodiments. Transistor Q6 operates similarly but phase shifted 180° with respect to transistor Q5. The drain voltages of transistors Q5 and Q6 differentially drive the high frequency transmit coil 12 with an AC signal, via the high frequency matching network 8.

Figure 4:
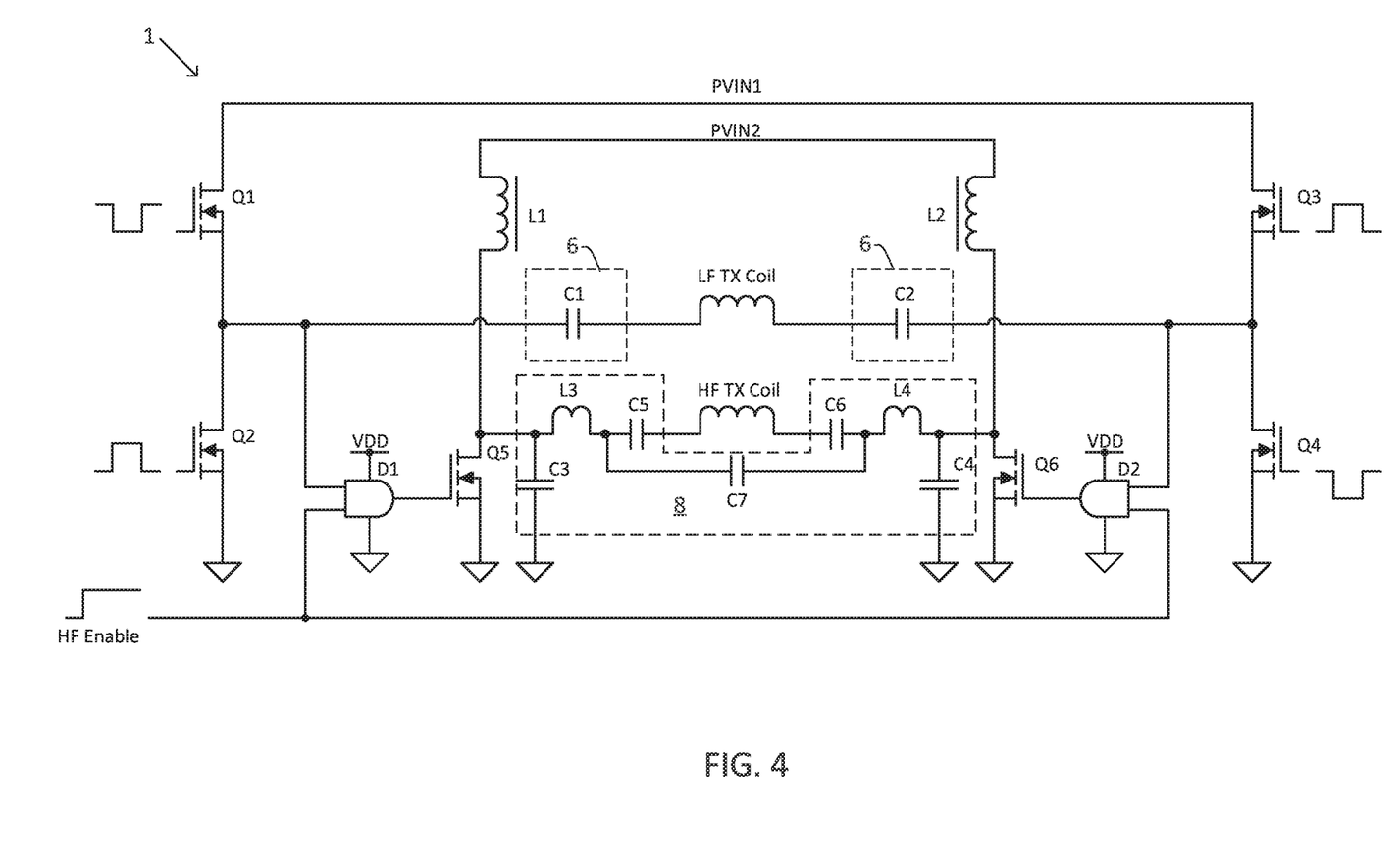
FIG. 4 shows an example of matching networks that may be implemented in the multi-mode wireless power transmitter of FIG. 2.

FIG. 4 shows examples of matching networks 6 and 8, according to some embodiments. In the example of FIG. 4, low frequency matching network 6 includes a pair of capacitors C1 and C2. High frequency matching network 8 includes capacitors C3-C7 and inductors L3 and L4, connected as shown. However, this is merely by way of example, as any suitable matching networks may be used for matching networks 6 and 8.

Figure 5:
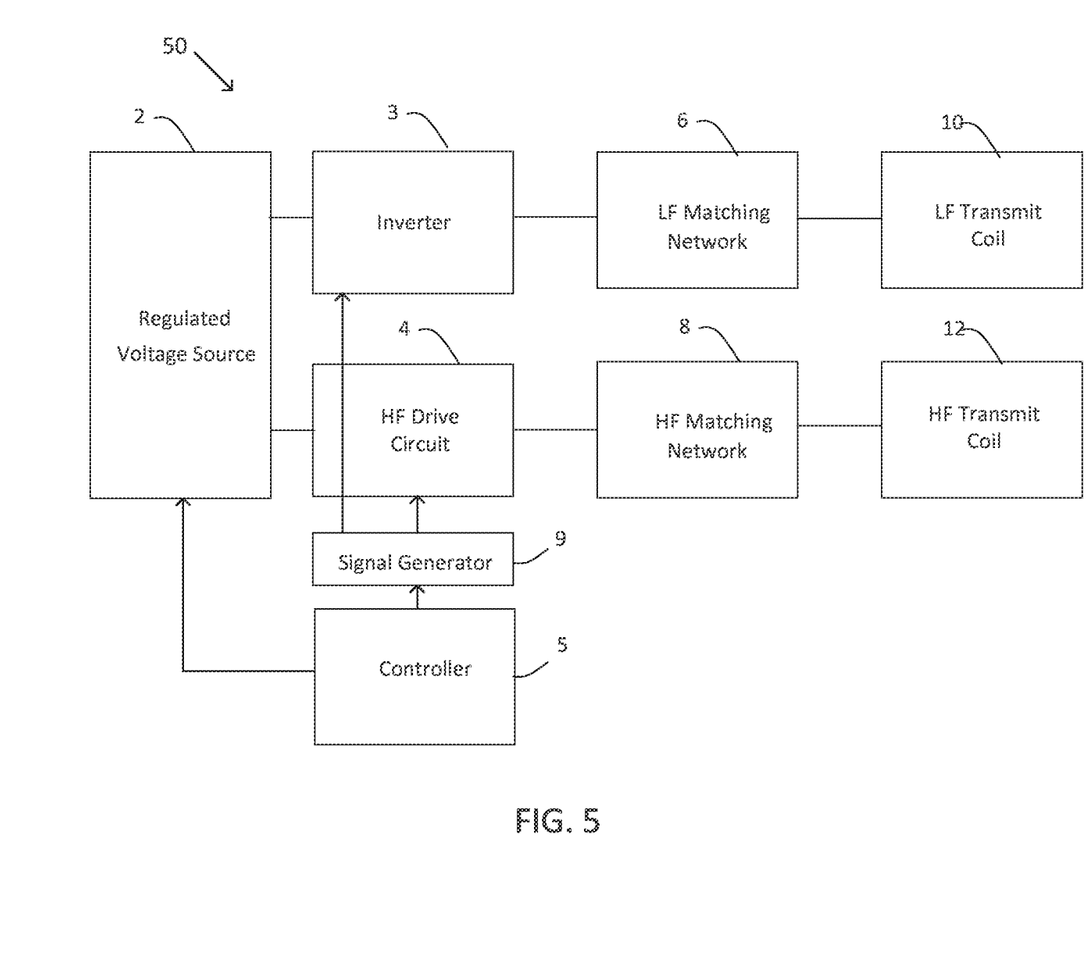
FIG. 5 shows a block diagram of a multi-mode wireless power transmitter, according to some embodiments, in which both the inverter and the high frequency drive circuit are driven by a signal generator.

FIG. 5 shows a block diagram of a multi-mode wireless power transmitter 50, according to some embodiments, in which the high frequency drive circuit 4 is driven by the signal generator 9 rather than by the inverter 3. In the example of FIG. 5, signal generator 9 may produce low frequency drive signals for driving the inverter 3 and high frequency drive signals for driving the high frequency drive circuit 4. In some embodiments, the low frequency drive circuit 3 comprises an non-resonant inverter and the high frequency drive circuit 4 comprises a resonant inverter.

Figure 6:
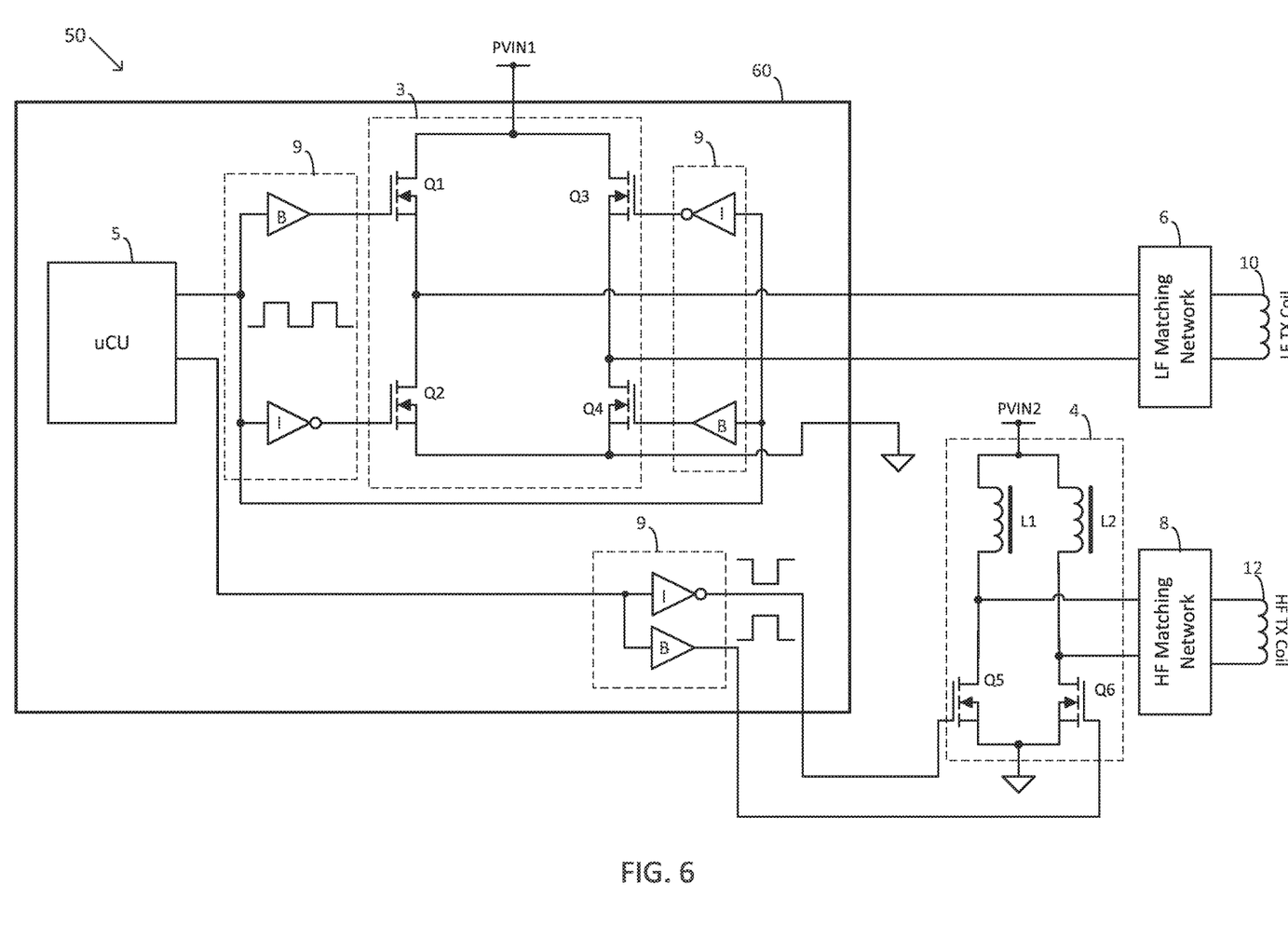
FIG. 6 shows an example of a multi-mode wireless power transmitter according to FIG. 5, in which some circuits of the multi-mode wireless power transmitter are implemented on an integrated circuit (on-chip) and some circuits of the multi-mode wireless power transmitter are integrated off-chip.

FIG. 6 shows an example of a multi-mode wireless power transmitter as illustrated in FIG. 5. In the example of FIG. 6, some of the circuits of the multi-mode wireless power transmitter are formed on an integrated circuit chip 60, including the controller 5, signal generator 9, and inverter circuit 3. Signal generator 9 may include inverters I and buffers B, as shown in FIG. 6, for driving transistors Q1-Q6. In some embodiments, the power inputs for inverters I and buffers B may be provided by regulated voltage source 2 (FIG. 5). In some embodiments, one or more components of the high-frequency drive circuit may be off-chip (separate from integrated circuit chip 60). For example, inductors L1 and L2 as well as transistors Q5 and Q6 may not be easily formed on-chip, and may be provided as discrete components. However, the techniques described herein are not limited in this respect, as in some embodiments the inductor(s) and/or the transistors Q5, Q6 may be small enough to be integrated on-chip. In some embodiments, the low frequency matching network 6, low frequency transmit coil 10, high frequency matching network 8 and high frequency transmit coil 12 may be formed off-chip. However, any or all of these components may be formed on-chip if they are sufficiently small in size and otherwise integral on the chip.

As discussed above, a variety of wireless power receivers are being designed which can receive wireless power at different frequencies. In some embodiments, the multi-mode wireless power transmitter may detect the type of receiver that is present in the vicinity of the multi-mode wireless power transmitter, either through communication with the receiver or another technique. For example, the multi-mode wireless power transmitter may detect or otherwise determine the wireless power specification used by the receiver. Such a determination may be made by the controller 5 of the multi-mode wireless power transmitter, in some embodiments. Controller 5 may then produce signals at the frequency suitable for wirelessly delivering power to the detected receiver.

A multi-mode wireless power transmitter may be controlled using controller 5, which may be implemented by any suitable type of circuitry. For example, the controller 5 may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A wireless power transmitter, comprising:
an integrated circuit comprising a first drive circuit of a first type, the first drive circuit being configured to drive a first transmit coil at a first frequency; and
a second drive circuit of a second type, the second drive circuit being separate from the integrated circuit, the second drive circuit being configured to drive a second transmit coil at a second frequency higher than the first frequency,
wherein the second drive circuit comprises an inverter and at least one inductor that resonates with at least one capacitor, and
wherein the wireless power transmitter further comprises a controller configured to control a switch of the second drive circuit to turn on at a time corresponding to or after a time at which resonance between the at least one inductor and the at least one capacitor reduces a voltage across the switch to a threshold value,
wherein the threshold value is greater than zero and less than half of an input voltage of the first drive circuit.

2. The wireless power transmitter of claim 1, wherein the inverter is a first inverter, and wherein the first drive circuit comprises a second inverter.

3. The wireless power transmitter of claim 2, wherein the second inverter comprises a push-pull drive circuit.

4. The wireless power transmitter of claim 1, wherein the inverter is a class E amplifier.

5. A wireless power transmitter, comprising:
a first drive circuit of a first type, the first drive circuit being configured to drive a first transmit coil at a first frequency; and
a second drive circuit of a second type, the second drive circuit being configured to drive a second transmit coil at a second frequency higher than the first frequency,
wherein the second drive circuit comprises an inverter and at least one inductor that resonates with at least one capacitor, and
wherein the wireless power transmitter further comprises a controller configured to control a switch of the second drive circuit to turn on at a time corresponding to or after a time at which resonance between the at least one inductor and the at least one capacitor reduces a voltage across the switch to a threshold value,
wherein the threshold value is greater than zero and less than half of an input voltage of the first drive circuit.

6. The wireless power transmitter of claim 5, wherein the inverter is a first inverter, wherein the first drive circuit comprises a second inverter, and wherein the second drive circuit comprises a resonant inverter.

* * * * *